United States Patent [19]
Kinsley, Jr.

[11] 3,943,984
[45] Mar. 16, 1976

[54] TREE SHEARS

[75] Inventor: Homan Benjamin Kinsley, Jr., Richmond, Va.

[73] Assignee: Ethyl Corporation, Richmond, Va.

[22] Filed: Oct. 24, 1974

[21] Appl. No.: 517,733

[52] U.S. Cl.................. 144/34 R; 83/519; 144/2 N
[51] Int. Cl.².......................................... A01G 23/08
[58] Field of Search...... 83/513, 519; 144/218, 2 N, 144/3 D, 34 R, 34 E

[56] References Cited
UNITED STATES PATENTS

| | | | |
|---|---|---|---|
| 2,612,194 | 9/1952 | Ingraham et al. | 144/34 E |
| 2,820,493 | 1/1958 | Davis | 144/34 E |
| 3,376,907 | 4/1968 | NcNeal | 144/2 N |
| 3,449,993 | 6/1969 | Temple et al. | 83/519 X |

FOREIGN PATENTS OR APPLICATIONS

| | | | |
|---|---|---|---|
| 884,384 | 4/1943 | France | 144/34 R |

Primary Examiner—Travis S. McGehee
Assistant Examiner—W. D. Bray
Attorney, Agent, or Firm—Donald L. Johnson; John F. Sieberth; David L. Ray

[57] ABSTRACT

An apparatus for slashing tree trunks into logs including at least two knives positioned at an acute angle relative to each other which are forced through the tree to meet at a point on the other side of the tree, or to meet an opposite pair of knives in the center of the tree. As the two knives travel through the tree, wood between the knives is chipped away and severed from the tree. The chipped wood is thus removed from the surface of the knives so that the chips do not bind the knives as they pass through the log or tree.

6 Claims, 8 Drawing Figures

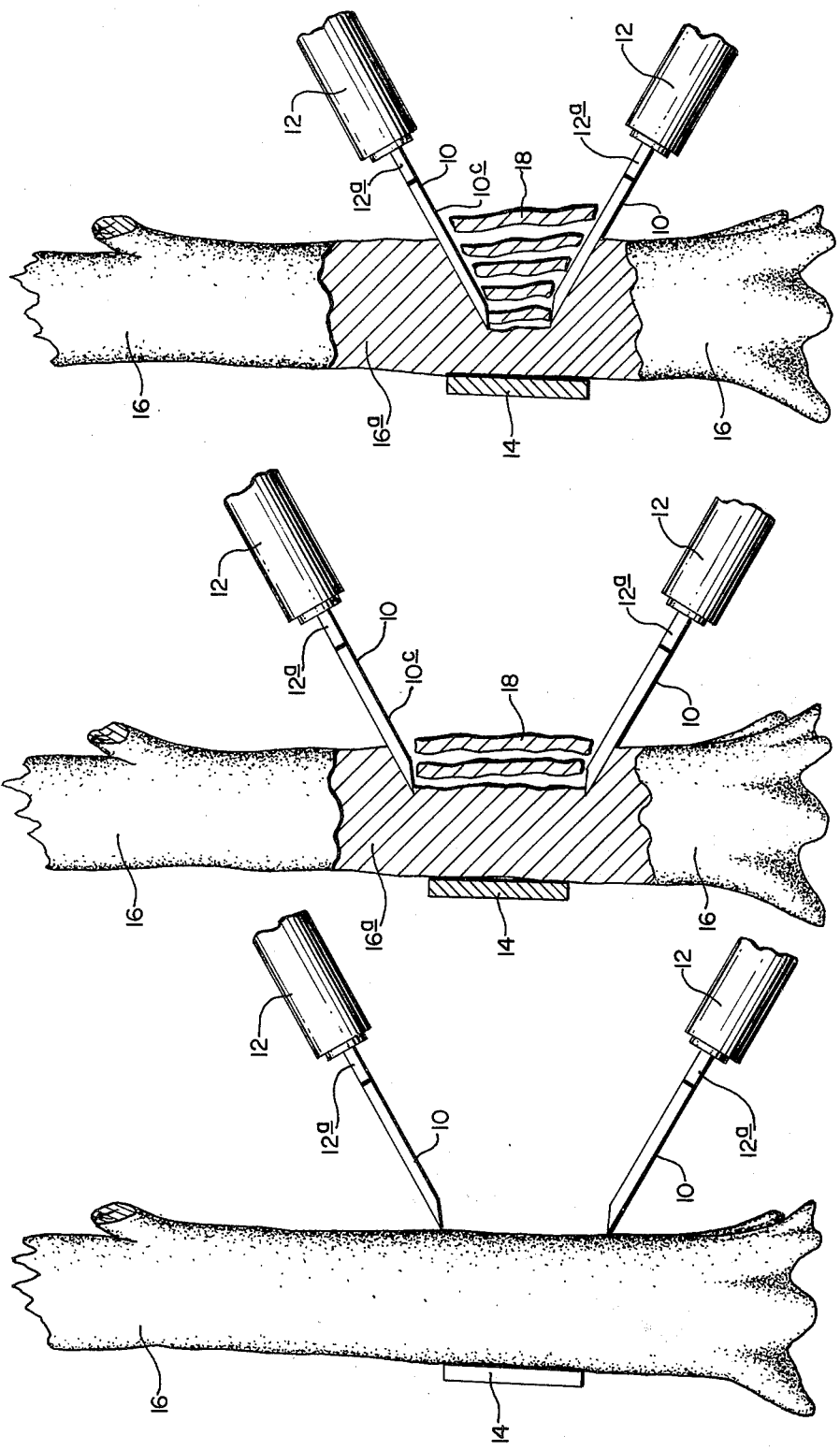

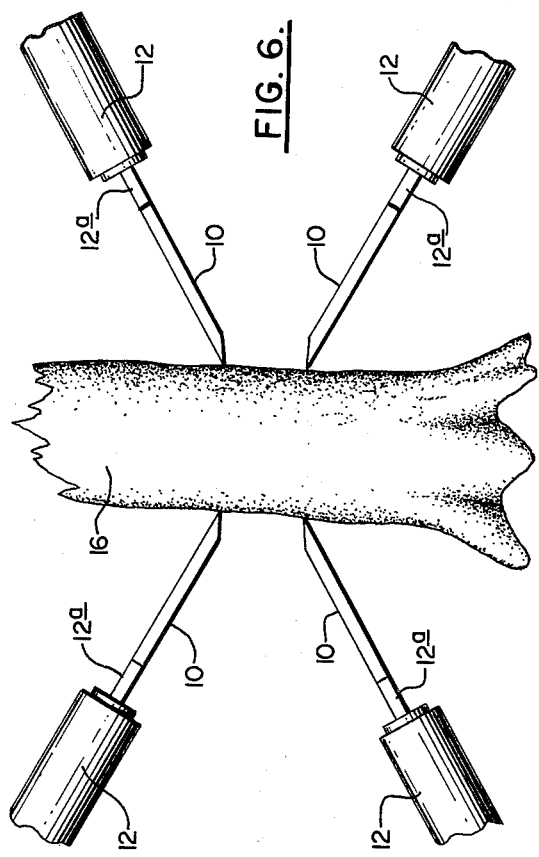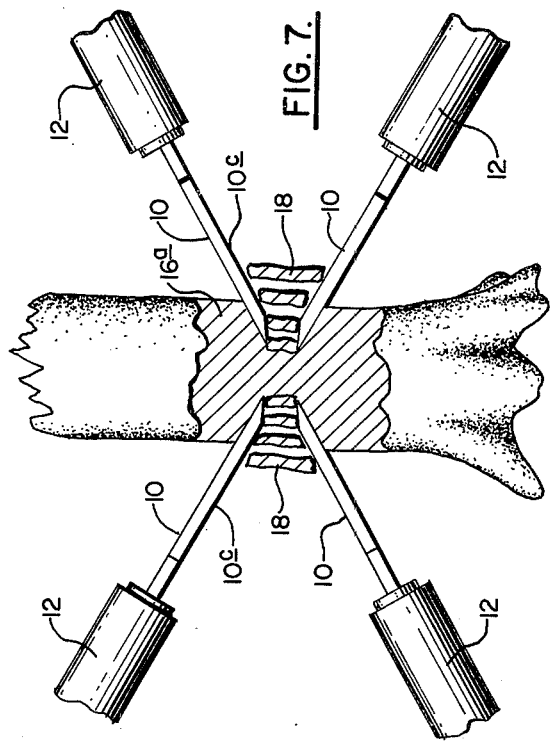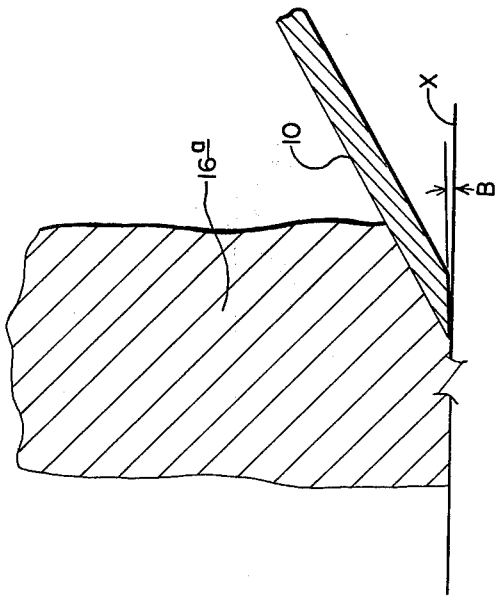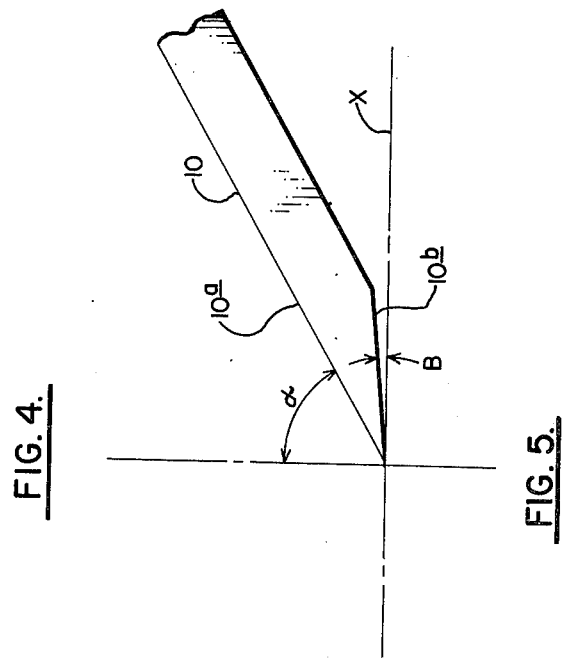

TREE SHEARS

BACKGROUND OF THE INVENTION

The present invention relates to an apparatus for slashing tree trunks or tree stems into logs, and for severing a tree near its base to fell the tree.

Tree shears are widely used throughout the United States to harvest trees, and in particular South Pine. The tree shears function by pressing a knife or knives through the grain of a tree, much like severing a rose stem with pruning shears. These shears use one knife and an anvil. Other shears use two knives which meet in the center of the tree. The advantages of tree shears over chain saw felling are speed (up to 500 trees per 8-hour day), low stumps and resultant lower trunk loss, reduction of the cost of preparing the site for the next crop of trees, the control of trees during felling, and less physical labor. One of the disadvantages of using tree shears is knife-induced splits along the tree trunk which are frequently quite serious. Frequently, on logs larger than 16 inches in diameter splits in the tree trunk caused by tree shears require a 4 foot trim to eliminate splits in the lumber made from the log.

SUMMARY OF THE INVENTION

The present invention is an apparatus for slashing tree trunks into logs which includes at least two knives positioned at an acute angle relative to each other which are forced through a tree to meet at a point on the other side of the tree.

In a further embodiment of the present invention two sets of two knives are positioned on each side of the tree, each knife of each set being positioned at an acute angle relative to each other, and the two sets of knives are forced through the tree to meet the opposite set of knives at a point in the center of the tree. As the knives travel through the tree, wood between the knives is chipped away and severed from the tree. The chipped wood is thus removed from the surface of the knives so that the chips do not bind the knives as they pass through the log or tree.

BRIEF DESCRIPTION OF THE DRAWINGS

FIG. 1 is a side elevational view of an embodiment of the present invention,

FIG. 2 is a partly sectional, side elevational view of an embodiment of the present invention, FIG. 3 is a partly sectional, side elevational view of an embodiment of the present invention, FIG. 4 is a schematic side elevational view of a knife in a tree trunk of the present invention, FIG. 5 is a schematic view of a knife of the present invention, FIG. 6 is an elevational side view of an additional embodiment of the present invention, FIG. 7 is a partly sectional side elevational view of the embodiment of FIG. 6.

DESCRIPTION OF THE PREFERRED EMBODIMENTS

Figure 8:
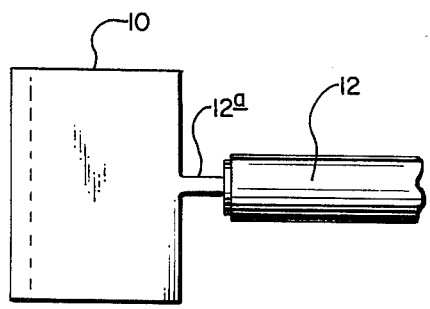
FIG. 8 is a top plan view of a knife blade of the present invention.

In FIGS. 1-3 is shown a tree 16 having an anvil 14 on one side thereof and knives 10 actuated by hydraulically operated pistons 12 on the other side thereof. The pistons 12 and anvil 14 are held in place by any suitable apparatus (not shown) known in the art.

In FIG. 2, the interior of the tree 16a is shown in cross-section. As can be seen in FIG. 2, when knife blades 10 enter the tree chips 18 will be formed by the cutting action of the knife blades 10. The chips 18 will fall outwardly from the tree so that they will no longer contact and cause friction with knife blades 10 and their interior surfaces 10b and 10c, thus permitting the blade 10 to move more easily through the tree.

As can be seen in FIG. 3, as the knives continue through the cross-sectional area 16a of the trunk of tree 16, they begin to converge and chips 18 continue to be thrown outwardly from the tree.

In FIG. 4 is shown a cross-section of tree 16a with knife blade 10 disposed therein. Knife 10 makes an angle beta with the horizontal indicated by the axis "$x$".

In FIG. 5 is shown the knife blade 10 in greater detail. As can be seen in FIG. 5, the top edge 10a of knife blade 10 makes an angle alpha with the vertical indicated by axis "$y$", whereas the bottom of beveled edge 10b of knife blade 10 makes an angle beta with the horizontal indicated by axis $x$. The same angles of FIG. 5 would apply to both the upper and lower knife blades 10—10. The angle between the outer edges 10a of a set of knives 10 is 180° minus 2 alpha, whereas the angle between the two beveled edges 10b of a set of knives 10—10 would be 2 beta. Angle alpha may vary from about 30° to about 70°, or, preferably from about 40° to about 60°. Angle beta may vary from about 0° to about 15°, or, preferably from about 5° to about 10°.

In FIGS. 6 and 7 are shown another embodiment of the present invention wherein anvil 14 is replaced by an additional set of knife blades identical to those shown in FIGS. 2 and 3, i.e., two sets of knife blades 10—10 mounted on hydraulic pistons 12—12 disposed upon each side of tree trunk 16. As the knife blades 10—10 are forced into the tree, as shown in FIG. 7, chips 18 will be cut from the tree and will fall to the ground therefore reducing friction on the interior surface 10b and 10c of the knife blade 10. The two sets of knives as shown in FIG. 7 are positioned so that they meet in the center of the tree trunk. Sets of pistons 12 are connected together by any suitable apparatus (not shown) which will rigidly hold the hydraulic pistons 12 in a configuration such that the knife blades will meet in the center of the tree.

In FIG. 8 is shown a top view of the knife blades of the present invention. As can be seen, the knife blade 10 connected to piston 12 by a guide 12a which is circular in cross-section and is adapted to be received in piston 12. As can be seen in FIG. 8, knife blade 10 is wider than the diameter of guide 12a.

What is claimed is:

1. An apparatus for slashing tree trunks into logs, comprising:
    a. at least two knife means positioned at an angle relative to each other adapted for positioning upon one side of the tree,
        i. each of said knife means having a straight outside edge and a beveled inside edge,
        ii. said angle between said outside edges of said knife means varying from about 120° to about 40°, and
        iii. said angle between said beveled edges of said knife means varying from about 0° to about 30°.
2. The apparatus of claim 1 wherein said angle between said outside edges of said knife means varies from about 100° to about 60°

3. The apparatus of claim 1 wherein the angle between said beveled edges of said knife means varies from about 10° to about 20°.

4. An apparatus for slashing tree trunks into logs comprising:
   a. at least two sets of knife means each of said sets containing at least two knife blade means, each of said sets being adapted for positioning upon sides of a tree trunk, each of said knife blade means and said set means being positioned at an acute angle relative to each other,
   b. means for forcing each of said sets of knife means through said tree toward each other,
   i. each of said knife means having a straight outside edge and a beveled inside edge,
   ii. said angle between said outside edges of said knife means varying from about 120° to about 40°, and
   iii. the angle between said beveled edges of said knife means varying from about 0° to about 30°.

5. The apparatus of claim 4 wherein said angle between said outside edges of said knife means varies from about 100° to about 60°

6. The apparatus of claim 4 wherein the angle between said beveled edges of said knife means varies from about 10° to about 20°.

* * * * *